United States Patent [19]

Zurcher

[11] 4,121,450

[45] Oct. 24, 1978

[54] APPARATUS FOR MEASURING THE DENSITY OF A MOVING ELONGATE MASS OF FILIFORM MATERIAL

[75] Inventor: Erwin Zurcher, Aire-Geneva, Switzerland

[73] Assignee: Zellweger Uster Ltd., Uster, Switzerland

[21] Appl. No.: 762,285

[22] Filed: Jan. 25, 1977

[30] Foreign Application Priority Data

Jan. 28, 1976 [CH] Switzerland .................. 1053/76

[51] Int. Cl.$^2$ ............................................. G01N 9/26
[52] U.S. Cl. ..................................... 73/32 R; 73/37.6
[58] Field of Search ................ 73/32 R, 37.5, 37.7, 73/37.6, 160; 131/21 R, 21 B

[56] References Cited

U.S. PATENT DOCUMENTS

| | | | |
|---|---|---|---|
| 2,407,100 | 9/1946 | Richardson | 73/32 R |
| 2,757,675 | 8/1956 | Powell | 131/21 B |
| 3,633,590 | 1/1972 | Pocock et al. | 73/37.7 |
| 3,728,894 | 4/1973 | Stern | 73/37.5 |
| 3,885,417 | 5/1975 | Stern | 73/37.7 |
| 3,990,292 | 11/1976 | Stern | 73/37.7 |

Primary Examiner—Stephen A. Kreitman
Attorney, Agent, or Firm—Karl F. Ross

[57] ABSTRACT

The density of an elongate fiber mass, in particular a fiber or filament sliver or roving, or a roll of tobacco, is continuously measured by passing the mass through a channel, supplying a fluid "e.g. air under pressure" to a transverse groove in the channel wall so that the fluid escapes along the channel at a rate dependent on said density, and measuring the pressure of the fluid upstream of the groove. Two further transverse grooves in the channel wall, between the first-mentioned groove and the ends of the channel, serve to extract the fluid, whereby the fluid flow and hence the density measurement are rendered independent of conditions at the channel ends. Preferably, a supplementary collector is provided between at least one end of the channel and the associated further groove, to extract any air that may enter the channel end.

1 Claim, 14 Drawing Figures

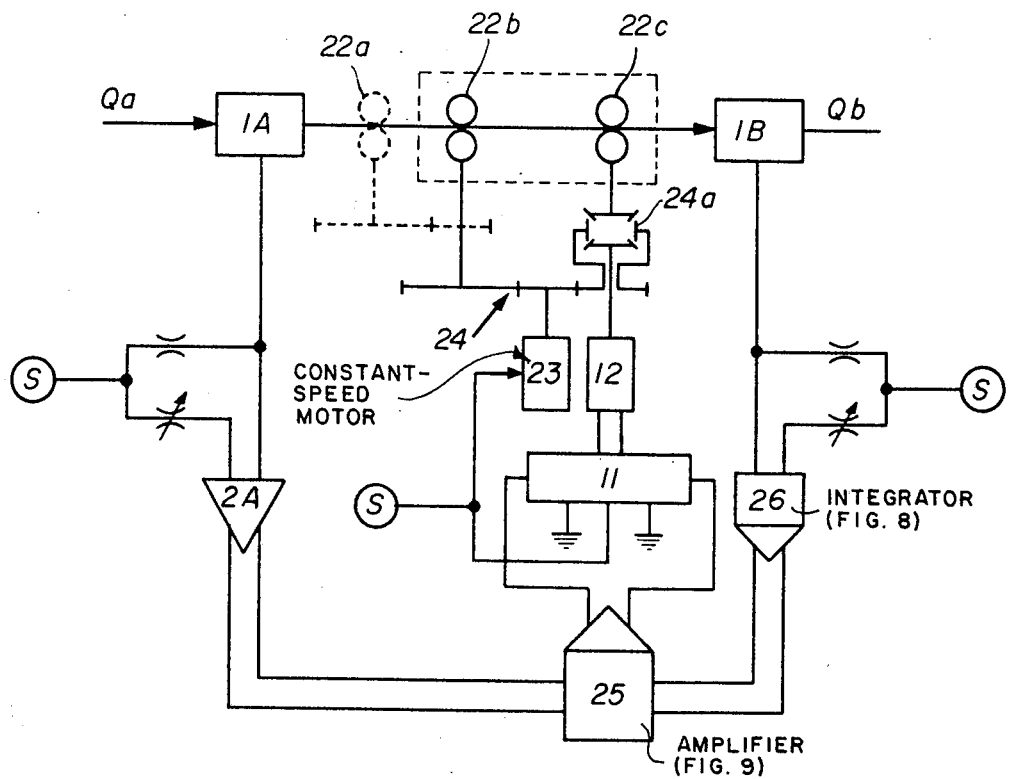
FIG. 3
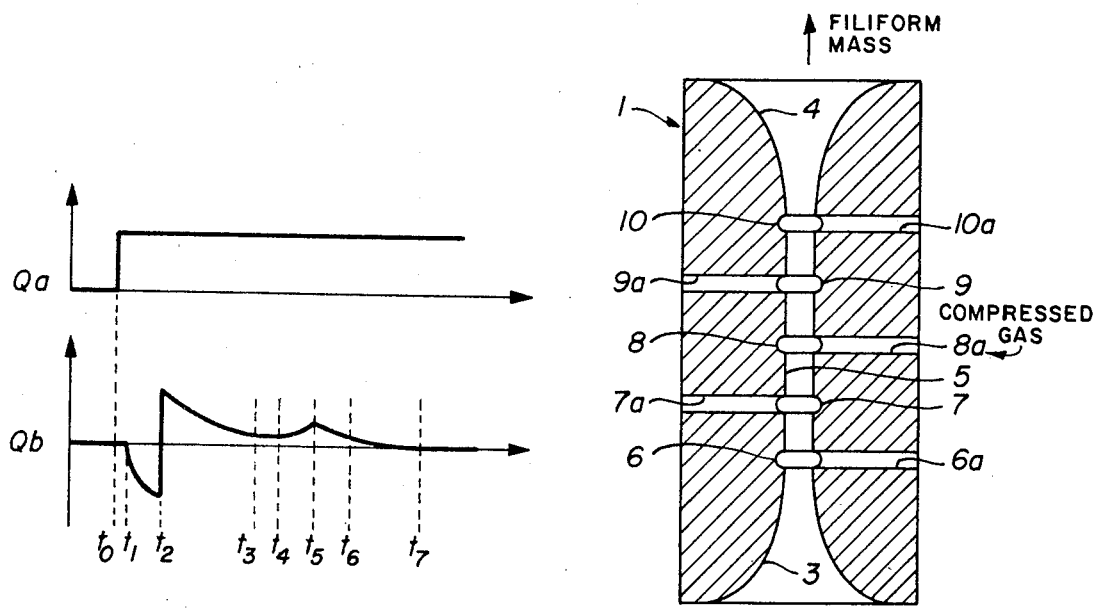
FIG. 6
FIG. 11

APPARATUS FOR MEASURING THE DENSITY OF A MOVING ELONGATE MASS OF FILIFORM MATERIAL

FIELD OF INVENTION

This invention relates to an apparatus for measuring the density of a moving elongate mass of filiform material.

BACKGROUND OF THE INVENTION

The measurement of the density of filiform particles such as tobacco or textile fibers or filaments, assembled in an elongate mass or body (e.g. a silver, a roving, a band, a wick or, a roll) is similar in a way to measuring the density of a porous material. This measurement is not easy, in particular when it is required to know the instantaneous characteristic value of the density of filiform materials in a continuous manufacturing process, for the purpose of controlling the proportioning of these materials.

This problem is encountered in particular in the textile field in measuring a textile fiber sliver intended for spinning, so as to adjust the drawing of the silver as a function of the fiber density measured over a determined section. An analogous problem is encountered in proportioning tobacco for manufacturing cigarettes.

Among the numerous ways of measuring textile fiber slivers used up to the present is, a pneumatic device whose operation is based on measuring the pressure generated by the air expelled from the sliver when the sliver is caused to pass from a channel of determined cross-section to an adjacent channel of smaller cross-section. The higher the fiber density in the sliver, the greater the increase in pressure of the expelled air for a given band-feed speed, and vice versa. The disadvantage of this device is its total dependence on the sliver-feed speed.

In another known device, the sliver is contracted to pass through a channel fed with pressurized air through a lateral conduit, the air escaping through the channel inlet and outlet openings. By measuring the pressure variation in the feed conduit, which is determined by the cross-sections of the channel inlet and outlet openings, which in turn is a function of the fiber density of the sliver passing through the openings, a signal is obtained proportional to the density. However, the fact that the air escapes through the same openings as those which are used for the passage of the sliver makes the device dependent on the material of the sliver as well as its structure. The sliver is contracted to enter the channel, and returns more or less to its initial dimensions on leaving the channel. This depends on the material of the fibers and their parallelism, which determine the degree of elasticity of the sliver. The compression and expansion of the sliver fibers at the inlet and outlet of the channel respectively influence the outflow of the air blown into the sliver, and thus falsify the signal measured in the feed conduit.

In the field of cigarette manufacture, tobacco proportioning problems are encountered which are very similar to those relating to the control of fiber density in a textile fiber sliver. At the present time, the quantity of tobacco discharged is evaluated by measuring the pressure drop through the tobacco layer, and the position of a member designed to fix the thickness of this layer is regulated. In certain cases the density of the tobacco roll is still measured with the aid of a $\beta$ particle source and detector. However this method of measurement is expensive and is not allowed under certain laws.

OBJECT OF THE INVENTION

The object of the present invention is to at least partly obviate the disadvantages of the aforesaid methods.

SUMMARY OF THE INVENTION

To this end, the present invention provides apparatus for the continuous measurement of the instantaneous density of an elongate mass of filiform particles passing through a determined measuring cross-section, which apparatus comprises a sensing element traversed by a channel of which at least a portion corresponds to said measuring cross-section, a source of pressurized fluid, a groove extending transversely to the axis of said channel and provided in a wall of the channel at said measuring cross-section, a conduit to connect said source to said groove, means for measuring the pressure in said conduit, Two collectors constituted by respective further groove extending transversely to said channel and provided in the wall of the channel respectively on one side and on the other side of the groove connected to said source, and further conduit means connected to said collectors for extracting the fluid from the channel.

Preferably the fluid is gaseous, e.g. air, but the fluid may be liquid in some applications of the invention.

The measuring cross-section is selected according to the mass of filiform particles to be measured, so that this mass, on passing through the said cross-section, will have a density such as to present to the fluid a resistance suitable to the pressure measurement. It will be understood that the relevant properties of the mass will be known in advance to be within a certain range of values.

BRIEF DESCRIPTION OF THE DRAWING

The The accompanying drawings illustrate diagrammatically, and by way of an example only, three embodiments of apparatus according to the invention used for controlling a drawing stand for textile silver or roving, and a further application of the invention for proportioning tobacco in a cigarette-maufacturing process. In the drawing:

FIG. 3 is a diagrammatic representation of a control circuit comprising an open and a closed loop circuit;

FIGS. 4 to 6 are operating diagrams (graphs) of the circuits of FIGS. 1 to 3 respectively;

FIG. 11 is an exial section through a sensing element;

SPECIFIC DESCRIPTION

Figure 1:
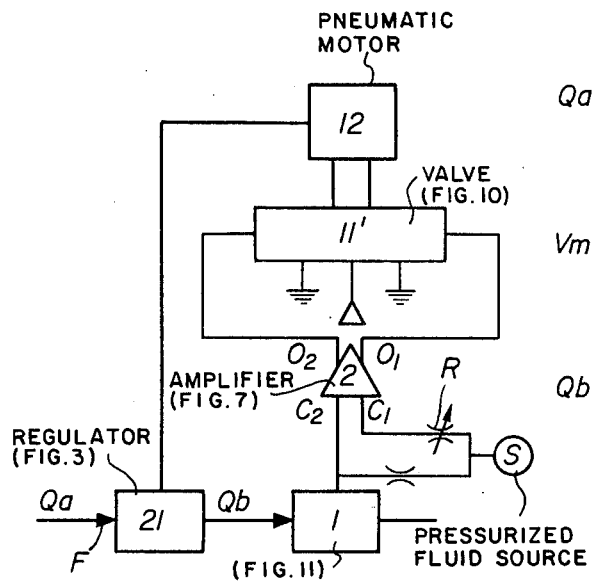
FIG. 1 is a diagrammatic illustration of a closed loop control circuit.

The control circuit shown in FIG. 1 comprises a source S of pressurized fluid, in particular air or other gas, connected to a sensing element 1 shown in greater detail in FIG. 11, and consisting of a sleeve comprising a bell neck inlet 3 and a bell neck outlet 4 connected together by a cylindrical channel 5 which provides a known measuring cross-section. Five annular inwardly open grooves 6 to 10 are distributed along the channel 5, each of the grooves being connected to a lateral conduit 6a to 10a respectively. The conduits 6a, 7a, 9a and 10a are discharge conduits to connect the grooves 6, 7 9 and 10 to the atmosphere, while the conduit 8a connects the sensing element to the source S of fluid under pressure (FIG. 1). The feed conduit 8a is connected to one of the inputs of an analog amplifier 2, while the second input of this amplifier is connected to the source S by way of a variable restriction R.

Figure 7:
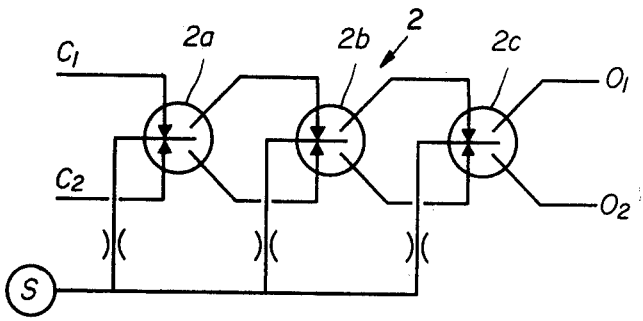
FIGS. 7 to 10 show details of the circuits of FIGS. 1 to 3.

The analog amplifier 2 shown in FIG. 7 comprises elementary amplifiers 2a, 2b and 2c disposed in series and connected in parallel to the feed conduit which connects the amplifiers to the source S. The first of these amplifiers comprises two inputs $C_1$, $C_2$ connected to the source S by way of a variable restriction R and to the sensing element 1 respectively. The signals appearing at the outputs $O_1$ and $O_2$ are proportional to the input signals at the input $C_1$ and $C_2$, but multiplied by a certain amplification factor.

Figure 10:
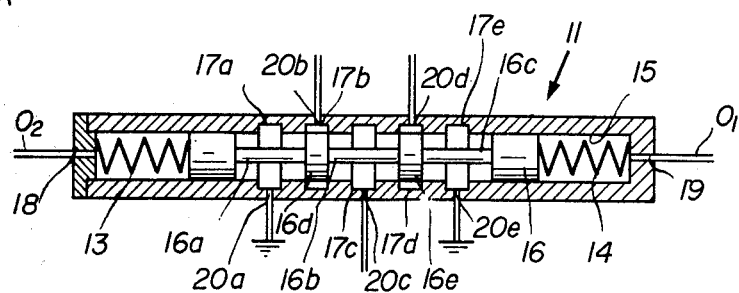

The two outputs $O_1$ and $O_2$ of the analog amplifier 2 are connected to a fluid control valve 11' shown in detail in FIG. 10, and which comprises two outlets connected to a pneumatic variable speed motor 12 which can rotate in either direction.

Figure 2:
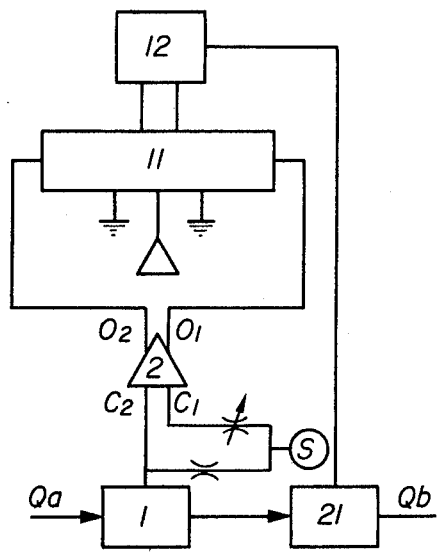
FIG. 2 is a diagrammatic representation of an open loop control circuit.

The control valve 11' used in the circuit shown in FIG. 1 is of the same type as the valve 11 shown in FIG. 10 but omits the springs 13 and 14 which are used only for the valves 11 associated with the circuits of FIGS. 2 and 3. The control valve has a cylindrical housing 15 in which a spool 16 is slidably mounted. The wall of this housing 15 comprises five annular grooves 17a 17b, 17c 17d and 17e each connected to the outside by way of respective apertures 20a, 20b, 20c, 20d and 20e provided laterally through the wall of the valve. Two further apertures 18 and 19 connect the respective ends of the interior of the housing 15 with the two outputs $O_2$ and $O_1$ of the amplifier 2. The spool 16 comprises three segments 16a, 16b, 16c of diameters substantially less than the internal diameter of the housing 15. Each of the intermediate lands 16d and 16e in contact with the wall of the housing 15 has an axial length corresponding to the length of the annular recesses 17b and 17d, relative to which they are in the position shown in FIG. 10. The central aperture 20c is the feed aperture for the valve, while the apertures 20b and 20d are selectively the distribution and escape apertures, according to the axial position of the spool 16. The apertures 20a and 20b are the exhaust apertures corresponding to the ground of an electrical appliance.

A variable-speed motor 12 is connected (FIG. 1) to a regulating member 21 shown in detail in the circuit of FIG. 3.

In the embodiment of FIG. 1 the textile fiber sliver or roving advances in the direction of the arrow F, with the regulating member 21 correcting any fault detected downstream of it by the sensing element 1, thus causing a certain lag between the measurement and the correction.

This disadvantage does not exist in the open-loop circuit of FIG. 2. This circuit comprises the same elements as those previously described, with the exception that the control valve 11 is as shown in FIG. 10, i.e. it comprises two springs 13 and 14 the purpose of which is to return the spool 16 into the position for closing the apertues 20b and 20d when no signal is present at the apertures 18 or 19. This position of the spool 16 corresponds to closure of the valve 11 and consequently stops the motor 12. In the open-loop circuit shown in FIG. 2 the regulating member 21 is disposed downstream of the sensing element 1.

The circuit of FIG. 3 is a combination of the circuits of FIGS. 1 and 2, i.e. it enables a measurement to be made before and after the regulating member 21, which is constituted in this example by three pairs of draw rollers 22a, 22b, 22c driven by a constant speed motor 23 and a gear train 24, the regulating mechanism being constituted by the variable speed motor 12 connected to the pair of rollers 22c by way of a differential 24a.

Figure 8:
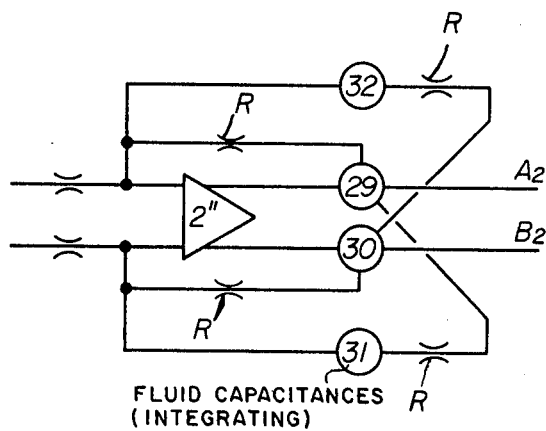
Figure 9:
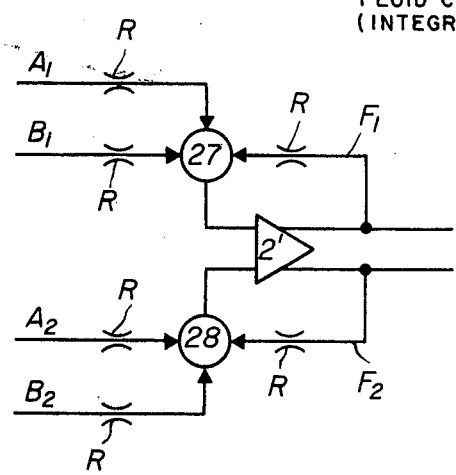

The combination of the two circuits is obtained by means of an amplifier 25 shown in detail in FIG. 9 and an integrator 26 shown in detail in FIG. 8.

The amplifier 25 (FIG. 9) is composed of an analog amplifier 2' similar to that shown in FIG. 7. The two inputs of this amplifier are connected to two enclosures 27 and 28 respectively, into each of which were led three conduits, namely conduits $A_1$, $B_1$ and $F_1$ on the one hand and $A_2$, $B_2$ and $F_2$ on the other hand. The conduits $A_1$, $B_1$ and $A_2$, $B_2$ originate respecively from the outputs of the analog amplifier 2A (FIG. 3) for the signals from a sensing element 1A, and from the outputs of the integrator 26 for the signals of a sensing element 1B. The conduits $F_1$ and $F_2$ represent feedback between the outputs of the amplifier 2' and the enclosures 27 and 28 respectively, and are intended to compensate for the effect of load variations downstream of the amplifier 2'.

Thus the analogue amplifier 2A feeds the amplifier 25 with amplified analog signals derived from the sensing element 1A. The integrator 26 shown in detail in FIG. 8 also comprises as its principal element an analog amplifier 2'' of the same type as that of FIG. 7. Each output from the amplifier 2'' is connected to a respective capacity 29 or 30, connected by way of a restrictor R directly to the respective input of the amplifier, and also connected by way of a restrictor R to a respective capacity 31 or 32, these being connected to respective inputs of the amplifier 2''. These capacities enable the signals appearing at the outputs of the amplifier 2'' to be integrated. The integrated signals are fed by the conduits $A_2$, $B_2$ to the amplifier 25.

The rest of the circuit situated on the output side of the amplifier 25 is identical to the circuit of FIG. 2, the control valve 11 being like that shown in detail in FIG. 10, i.e. a valve provided with springs 13 and 14.

In this embodiment, the sum of the signals emitted by sensing elements 1A and 1B determines the position of the control valve spool 16 and consequently the direction and speed of rotation of the variable speed motor 12. The purpose of the latter is to add or subtract a certain speed, proportional to the signal received by the valve 11, to or from the speed transmitted to the rollers 22c by the constant speed motor 23.

Although it is not shown in detail in FIGS. 1 and 2, the regulating member 21 of the circuits shown in FIGS. 1 and 2 is similar to that of FIG. 3, and because of the differential enables the speed of a pair of draw rollers to be increased or reduced.

On inserting the sliver or roving into the sensing element shown in FIG. 11, the inlet bellmouth 3 causes the silver or roving to contract. The purpose of the first groove 6 is to allow the air expelled by this contraction to escape through the conduit 6a. As the core of filaments travels from the inlet 3 to the outlet 4, the air blown through the conduit 8a is able to escape through the conduits 7a and 9a because of the grooves 7 and 9, the resistance to the passage of the air blown into the aperture 8a forming the signal received by the amplifier 2 of FIGS. 1 and 2 or by the amplifier 2A and integrator 26 of FIG. 3.

The two grooves 7 and 9 and the two conduits 7a and 9a enable the air fed by the conduit 8a to escape after following, for a certain distance, the channel 5. The higher the speed of the sliver or roving, the greater the proportion of air entrained by it towards the groove 9. As the cross-section of each of the conduits 7a and 9a is substantially equal to that of the feed conduit 8a any increase in the volume of air escaping through the conduit 9a to the detriment of the conduit 7a, due to the piston effect created by the forward movement of the sliver or roving in the channel 5, has no influence on the accuracy of the pressure measurement in the feed conduit 8a. The fact that the annular groove 9 is at a certain distance from the outlet 4 removes this groove 9 from the influence of the suction effect which could occur due to the more or less rapid expansion of the silver or roving on emerging from the channel 5. However it could still be advantageous to provide a supplementary groove 10 connected to atmosphere via a conduit 10a to ensure that the air which could return in countercurrent into the channel 5 escapes through the conduit 10a before reaching the groove 9.

The escape conduit 6 also has a role to play in making the accuracy of the measurement independent of the speed. Since part of the air expelled by the contraction of the sliver or roving in the bellmouth inlet 3 may be entrained into the channel 5, so increasing the pressure measured in the conduit 8a, the purpoe of the groove 6 and conduit 6a is to enable this air to escape.

The accuracy of the results of measurements made by this sensing element at different speeds or given lengths of silver or roving has been compared with results obtained by weighing the same lengths on a highly accurate balance. These tests have shown that the accuracy of the sensing element over the range of speed from 4/min to 100 m/min is of the order of a percent, which is within the allowable tolerances.

Figure 4:
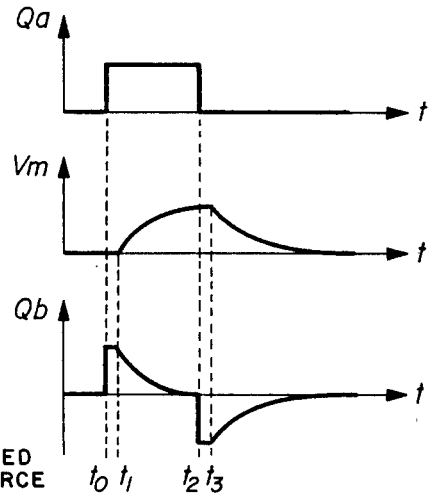

Referring now to the closed-loop circuit shown in FIG. 1 and the operating diagrams of FIG. 4, the effect can be seen of a variation in the parameter measured by the sensing element 1. Assuming that the fibre density at the inlet to the regulating member 21 increases at time $t_0$, a time $(t_1-t_0)$ passes before this defect reaches the sensing element 1. The amplification of the signal corresponding to this defect causes the speed $V_m$ of motor 12 to accelerate between time $t_1$ and time $t_2$. The time $t_2$ corresponds to the disappearance of the defect. As there is a certain lag between the measurement and the correction, it is only from $t_3$ that the motor 12 decelerates. The effect of this deceleration is seen in the diagram of FIG. 4 at the outlet of the regulating member 21, producing below the abscissa a curve symmetrical to that produced during the acceleration of the motor, so that the two defectss compensate each other.

Figure 5:
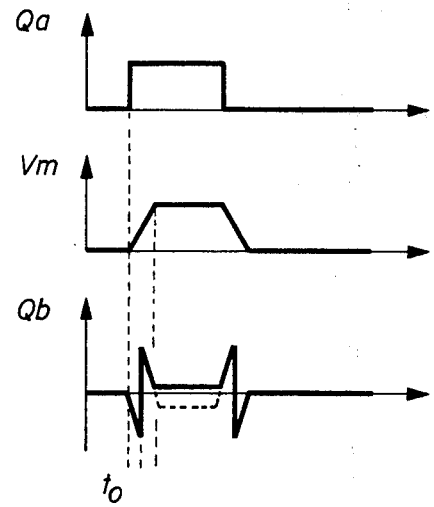

If the same defect is presented in the case of the circuit of FIG. 2, the diagram of FIG. 5 shows that the signal $Q_a$ is measured upstream of the regulating member 21, at a time $t_0$ the defect causes acceleration of the speed $V_m$ of the motor 12 before the defect reaches the regulating member, so that the sliver or roving is subjected to extra drawing. When the defect penetrates into the regulating member 21, it causes a sudden increase in the value $Q_b$ which is then reduced because of the acceleration of the motor 12. A very slight defect may subsist during the correction. The motor then decelerates while the defect is still partly in the regulating member, to again give rise to two symmetrical peaks which substantially compensate each other.

Finally in the circuit of FIG. 3, the diagram of FIG. 6 shows that if a defect arrives at the inlet of the sensing element 1A at the time $t_0$, the resulting acceleration of the motor 12 occurs with a certain lead, so that between time $t_1$ and time $t_3$ the motor 12 accelerates, time $t_2$ corresponding to the introduction of the defect between the draw rollers 22b and 22c. The time $t_4$ indicates the influence of the peak formed between $t_1$ and $t_2$ and the moment when it is detected by the second sensing element 1B, to cause deceleration of the motor until $t_5$, this moment corresponding to the detection of the peak $t_2$ situated above the abscissa, to again cause slight acceleration of the motor until time $t_7$.

Figure 12:
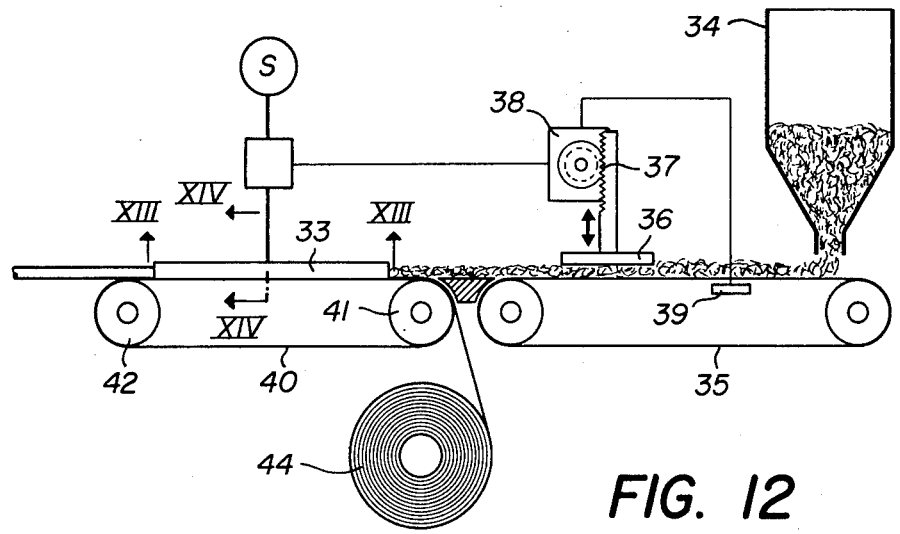
FIG. 12 is a very diagrammatic overall view of an installation for manufacturing cigarettes.
Figure 13:
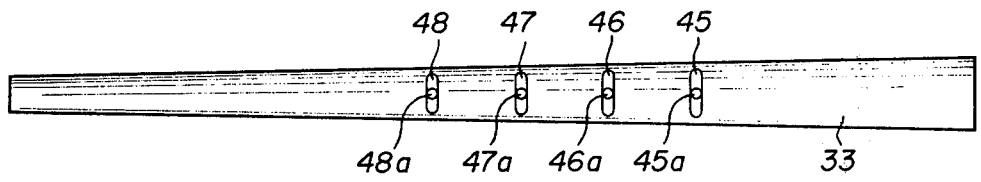
FIG. 13 is an enlarged detail view taken along the line XIII—XIII of FIG. 12.
Figure 14:
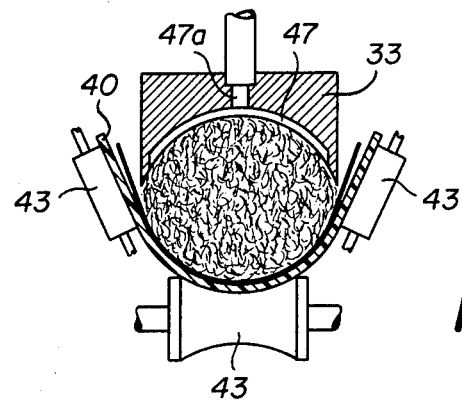
FIG. 14 is a section on the line XV—XV of FIG. 12.

FIGS. 12 to 14 show very diagrammatically the application of the invention to measuring the density of tobacco during the formation of a roll of tobacco for making cigarettes. A sensing element analogous to that of FIG. 11 forms a member 33 for shaping the roll of tobacco. As shown in FIG. 12, the tobacco, which is stored in a hopper 34, is deposited on a first porous conveyor belt 35 to form a layer, the thickness of which is fixed by a member 36 the height of which is adjustable, for example by a piston, worm, or rack mechanism 37 or the like, driven by a motor 38. A circuit similar to that of FIG. 3 is adapted for controlling this modification. A first vacuum sensor 39 makes a first measurement "upstream" of the member 36, while the sensing element forming the member 33 makes a measurement downstream in the manner of the element 1 of FIG. 11.

As shown in FIGS. 13 and 14, the member 33 forms a channel for shaping the roll in cooperation with a second endless belt 40 progressively curved, in running from a pulley 41 to a pulley 42, by means of rollers 43 (FIG. 14). The belt 40 is fed with a paper strip stored in the form of a roll 44 and designed to envelop the roll of tobacco.

FIG. 13 shows the roll-forming part of the member 33. This part is in the form of a substantially semi-circular trough the cross-section of which decreases progressively in the feed direction of the roll of tobacco. Four slots 45, 46, 47 and 48 are provided in this trough and extend transversely to its longitudinal axis, stopping before reaching the edges of the trough. Respective apertures 45a, 46a, 47a 48a connect these slots to the outside of the roll shaping channel. The aperture 47a is connected to a source S of pressurized fluid while the grooves 46 and 48 and their apertures 46a and 48a serve for evacuating the pressurized fluid fed into the roll through the aperture 47a. The groove 45 and aperture 45a serve to collect and evacuate any air entrained into the inlet end of the trough by the moving roll of tobacco. The rest of the device operates as in the case of the previous examples, i.e. the pressure fluctuations between the source S and aperture 47a are detected and control the motor 38 which regulates the height of the member 36. As circuit examples have already been described, this part of the measuring device is neither shown nor described. This modification has been described essentially with the object of demonstrating one adaptation of the sensing element of FIG. 11 to a particular application.

I claim:

1. An apparatus for the continuous measurement of the instantaneous density of a strand of a compressible mass of filiform particles, said apparatus comprising:

(a) A body formed with a throughgoing bore having a measuring cross section dimensioned to cause compression of said mass upon the passage of said strand through said bore in a direction in advance of said strand, a curved mouth converging in said direction at an inlet end of said bore, a curved discharge end of said bore converging in said direction and opposite said mouth, a first inwardly open annular groove formed at the wall of said bore intermediate said ends thereof, a pair of second inwardly open annular grooves formed in the wall of said bore between said first groove and each of the ends of said bore respectively, and a pair of respective inwardly open annular third grooves disposed between each of said second grooves and respective ends of said bore;

means for advancing said strand into said bore through said mouth whereby said mass is progressively compressed, and thence through said bore to emerge at the end thereof opposite said mouth;

a source of pressurized fluid;

a first conduit connecting said source to said first groove to supply said fluid to said measuring cross section whereby the resistance of flow of the fluid from said first groove into said bore is a function of the instantaneous density of said mass independent of the speed thereof;

means for measuring the pressure in said conduit for producing an indication of said instantaneous density;

second conduits connected to said second grooves and open to the atmosphere; and third conduits communicating with said third grooves and discharging air from the strand.

* * * * *